United States Patent [19]

Hardman et al.

[11] 4,329,273

[45] May 11, 1982

[54] SELF-BONDING SILICONE RUBBER COMPOSITIONS

[75] Inventors: Bruce B. Hardman, Clifton Park; George M. Dujack, Troy, both of N.Y.

[73] Assignee: General Electric Company, Waterford, N.Y.

[21] Appl. No.: 145,944

[22] Filed: May 2, 1980

Related U.S. Application Data

[63] Continuation of Ser. No. 20,104, Mar. 12, 1979, abandoned, which is a continuation of Ser. No. 884,461, Mar. 7, 1978, abandoned.

[51] Int. Cl.$^3$ ............................................. C08L 83/04
[52] U.S. Cl. ................................. 524/862; 528/15; 528/18; 528/31; 528/32; 528/33; 528/42; 528/43
[58] Field of Search ............... 528/15, 18, 31, 32, 528/33, 42, 43; 260/37 SB

[56] References Cited

U.S. PATENT DOCUMENTS

| | | | |
|---|---|---|---|
| 3,527,655 | 9/1970 | Ballard | 117/72 |
| 3,882,083 | 5/1975 | Berger | 260/46.5 |
| 3,957,713 | 5/1976 | Jeram et al. | 260/32.8 SB |
| 4,041,010 | 8/1977 | Jeram | 260/42.26 |
| 4,061,609 | 12/1977 | Bobear | 260/9 |

*Primary Examiner*—Melvyn I. Marquis
*Attorney, Agent, or Firm*—E. Philip Koltos

[57] ABSTRACT

A self-bonding silicone rubber composition comprising a vinyl-terminated polysiloxane polymer, a hydride siloxane cross-linking agent, a platinum catalyst and as the self-bonding additive, the partial hydrolysis product of an aliphatically unsaturated hydrolyzable alkoxy silane.

10 Claims, No Drawings

SELF-BONDING SILICONE RUBBER COMPOSITIONS

This is a continuation of application Ser. No. 20,104, filed Mar. 12, 1979, now abandoned, which is a continuation of patent application Ser. No. 884,461, filed Mar. 7, 1978 and now abandoned.

BACKGROUND OF THE INVENTION

The present invention relates to self-bonding silicone rubber compositions and more particularly the present invention relates to SiH-olefin platinum catalyzed self-bonding silicone rubber compositions in which the self-bonding additive is the partial hydrolysis product of an aliphatically unsaturated hydrolyzable alkoxy silane.

SiH-olefin platinum catalyzed compositions are well known. Such compositions generally comprise a vinyl-containing polysiloxane polymer as the base polymer, a filler which may be a reinforcing filler such as fumed silica or precipitated silica, or an extending filler such as fused quartz incorporated into the base vinyl containing polymer. Also, a vinyl containing silicone resin may be used with or in place of reinforcing fillers. Such a mixture is generally stored separately. The cross-linking portion of the composition comprises a hydride siloxane which may either be a hydride-containing polysiloxane or hydride containing silicone resin. A platinum catalyst is used to promote the cure. Various other ingredients may be added to the composition so as to enhance its cured physical properties such as, for instance, there may be added to the composition low viscosity vinyl-containing polymers. The platinum catalyst may either be incorporated with the base vinyl-containing polymer and filler or it may be packaged with the hydride siloxane cross-linking agent. When it is desired to cure the composition, the two packages or two components are mixed together and the composition is applied in the desired manner and cures at room temperature or at higher temperatures to form a silicone elastomer.

There may be incorporated into such compositions well known inhibiters such as, for instance, acetylenic compounds and other types of compounds which inhibit the cure of the composition at room temperature. When such an inhibited composition is heated at elevated temperatures, that is temperatures above 100° C., the effect of the inhibitor is destroyed and the composition cures rapidly in a number of minutes to produce a silicone elastomer. Such inhibitors are used in these SiH-olefin platinum catalyzed compositions so as to enhance their pot life or working life after the two packages are mixed and prior to cure.

There also has been developed a one-component SiH-olefin platinum catalyzed silicone rubber composition in which the inhibitor is a hydroperoxy compound which is so effective that the composition can be packaged as a one package system for prolonged periods of time and yet when exposed to elevated temperatures can cure to form a silicone elastomer in a matter of minutes. Such a composition is, for instance, disclosed in the patent application of William J. Bobear, entitled "Inhibitor for Platinum Catalyzed Silicone Rubber Compositions", Ser. No. 675,377, now U.S. Pat. No. 4,061,609.

Such SiH-olefin platinum catalyzed compositions find great use as for the preparation of silicone molds, for paper release coatings and as encapsulants. However, while such compositions are very suitable for paper release applications and for silicone molds because of their good release properties, such silicone rubber compositions are utilized with some difficulty as encapsulants and for potting applications because of poor adherence to required bonding surfaces. For potting applications, it is often desired to pot or enclose electric circuitry with a silicone composition to protect the electric circuitry from dirt, moisture and mechanical shock. There has even been developed a clear SiH-olefin platinum catalyzed composition for such potting and encapsulating applications so that if there is a malfunction in the electric circuitry, the technician can view the circuitry through the clear potting composition to determine the corrective action to be taken.

Other relevant properties of such SiH-olefin platinum catalyzed compositions for potting and encapsulating electric circuitry are that they are non-conductive of electricity, resistant to ozone and weathering, and water repellent. These properties make such compositions ideal encapsulant and potting materials. However, such SiH-olefin platinum catalyzed compositions still had difficulty with respect to potting and encapsulating applications. Because of their good release properties these SiH-olefin platinum catalyzed silicone rubber compositions would not adhere very well to the electric circuitry and circuitry board substrates such that a very poor bond was formed between the silicone elastomeric composition and the substrates. Accordingly, because of the formation of such poor bonds between the silicone elastomeric composition and the encapsulated substrate, the silicone elastomeric encapsulant or potting compound had a tendency to come loose from the substrate and thus not fully protect the electric circuitry from moisture, dirt and mechanical shock.

To solve this problem, primers were developed for such SiH-olefin platinum catalyzed compositions to apply them to metal substrates and specifically, electric circuitry substrates and the electric circuitry itself so that the cured silicone elastomer would adhere with good bond strength to the encapsulated and potted substrate. Such primer compositions are generally combinations of active ingredients dissolved in a volatile solvent or solvent mixture. The primer is applied to the substrate to be encapsulated or potted, say by wiping or spraying. The solvent is allowed to evaporate, leaving a surface coating more suited to bonding. The silicone rubber potting composition is applied thereover and allowed to cure to produce a silicone elastomer with a good bond between the silicone elastomer and the electric circuitry that is to be potted or encapsulated. Unfortunately, clear silicone potting compounds that employ vinyl containing silicone resins rather than fillers for reinforcement still did not adhere satisfactorily even when such primers were employed. Examples of materials that are desired for electric circuitry substrates that are to be bonded to by such SiH-olefin platinum catalyzed compositions are for instance, glass, aluminum, steel, copper and stainless steel which, of course, includes the metals of the electric circuitry itself. Accordingly, the use of such primers sometimes operated with effectiveness to bind such SiH-olefin platinum catalyzed compositions with good bond strengths to the foregoing metal substrates. However, even when they worked well there were various problems associated with primers.

First and foremost of all, it required an additional step in the preparation of the encapsulated or potted electric circuitry apparatus, that is, the application of the primer to the substrate. In addition it increased the cost of the total operation both in the labor involved to apply the primer composition to the electric circuitry substrate and also in the cost of manufacture and distribution of the primer composition itself. Further, such use of primer compositions made it necessary to set forth more detailed instructions than was usual in the preparation of the encapsulated apparatus. Accordingly, for such encapsulated and potting applications it is highly desirable to have an SiH-olefin platinum catalyzed composition which has a self-bonding additive in it such that a primer is not needed for the application of the composition to encapsulate or pot electric circuitry. It is especially highly desirable to have a clear SiH-olefin platinum catalyzed composition which has a self-bonding additive in it, such that satisfactory adherence is obtained without the use of a primer. Various attempts have been made to accomplish this but failed for one reason or another. One of the reasons why many of the additives that were added to the SiH-olefin platinum catalyzed composition did not operate properly was that the additive would poison or deactivate the platinum catalyst such that the composition would not cure upon application. Other supposed self-bonding additives were simply not effective in establishing a good bond between the cured elastomer and the substrates of interest. Silyltriallylisocyanurates were, for instance, tried as self-bonding additives for room temperature compositions but such additives did not perform as well as would be desired. Such use of the silyltriallylisocyanurates in traditional room temperature vulcanizable compositions are, for instance, set forth in Hardman and Berger, U.S. Pat. No. 3,882,083, whose disclosure is hereby incorporated by reference. Another example of such an SiH-olefin platinum catalysed composition is to be found in Ballard U.S. Pat. No. 3,527,655. The adhesive component of this composition was the reaction product of a vinyltrichlorosilane and a vinyl trialkoxy silane. Accordingly, it was highly desirable to find a self-bonding additive for SiH-olefin platinum catalyzed compositions which would adhere such compositions with good bond strength and in the absence of a primer to such diverse substrates as glass, aluminum, steel, copper, stainless steel, so that such compositions would be desirable compositions for the encapsulation and potting of electrical circuitry.

It is one object of the present invention to provide for a self-bonding additive for SiH-olefin platinum catalyzed compositions. It is another object of the present invention to provide for a process for producing a self-bonding SiH-olefin platinum catalyzed composition. It is an additional object of the present invention to provide for a process for adhering SiH-olefin platinum catalyzed compositions to electrical circuitry substrates without the use of a primer.

It is still an additional object of the present invention to provide for an inexpensive self-bonding additive for SiH-olefin platinum catalyzed compositions.

It is still a further object of the present invention to provide for a preferred process for producing a partial hydrolysis product of an aliphatically unsaturated hydrolyzable alkoxy silane, which can be utilized as a self-bonding additive for SiH-olefin platinum catalyzed compositions.

These and other objects of the present invention are accomplished by means of the disclosure set forth hereinbelow.

SUMMARY OF THE INVENTION

There is provided by the present invention and in accordance with the above objects, a self-bonding silicone rubber composition comprising (A) 100 parts by weight of a base polymer of the formula,

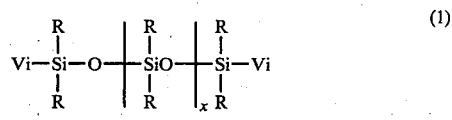

where R is selected from the class consisting of monovalent hydrocarbon radicals and halogenated monovalent hydrocarbon radicals and x is such that the viscosity of the base polymer varies from 100 to 200,000,000 centipoise at 25° C.; (B) from 0.5 to 50 parts by weight of a hydride siloxane cross-linking agent; (C) from 1 to 500 parts per million of a platinum catalyst; and (D) from 0.1 to 5 parts by weight of a self-bonding additive which is the partial hydrolysis product of an aliphatically unsaturated hydrolyzable alkoxy silane. The partial hydrolysis product is most preferably that of vinyltriethoxysilane. There can also be incorporated from 10 to 100 parts of a vinyl-containing silicone reinforcing resin in addition to or in place of reinforcing filler composed of $R^6SiO_{0.5}$ units and $SiO_2$ units in which from about 2.5 to 10 mole percent of the silicon atoms contain silicon-bonded vinyl groups where $R^6$ is a monovalent hydrocarbon radical.

It should be noted that the pure vinyltriethoxysilane will not function as a self-bonding additive in SiH-olefin platinum catalyzed compositions. On the other hand, the completely hydrolyzed vinyltriethoxysilane cannot be used as a self-bonding additive in SiH-olefin platinum catalyzed compositions since it is in the form of a resinous gel and is not miscible with the composition and thus will not perform a self-bonding function. Further, such a gel cannot be beneficially incorporated into SiH-olefin platinum catalyzed compositions since its presence would seriously detract from their final cured physical properties. It is the advantage of the self-bonding additive of the instant case that when properly used in the appropriate concentrations that it will not detract significantly from the final cured physical properties of the silicone elastomer that is formed.

To produce the proper partial hydrolysis product of the aliphatically unsaturated silane, it is desirable that 16 to 49% of the available hydrocarbonoxy groups of said alkoxy silane be hydrolyzed in the process for producing the partial hydrolyzate. If less than 16% is hydrolyzed then too large an amount of the vinyltriethoxysilane which does not act as a self-bonding additive and which further dilutes the effectiveness of the partial hydrolysis product may remain in the hydrolyzate mixture. If more than 49% of the available hydrocarbonoxy groups in the silane is hydrolyzed, then you encounter the aforementioned problems of the formation of gels which is undesirable in the final product.

The hydride cross-linking agent may be either a hydride-containing linear polysiloxane polymer or it may be a hydride containing silicone resin composed of monofunctional and tetrafunctional siloxy units or a hydride-containing silicone resin composed of monofunctional, tetrafunctional and/or difunctional siloxy units.

It should also be noted that with the self-bonding additive of the present invention, the composition must be cured at elevated temperatures since the self-bonding additive acts as an inhibitor and it does not permit the composition to cure at room temperatures for prolonged periods of time such as, two weeks after the two components are mixed. In addition, in the proposed use of the self-bonding additive in the instant invention it is desirable that the self-bonding additive not be incorporated into the component of the two component SiH-olefin platinum catalyzed compositions of the instant case which contain the platinum catalyst, since it may deactivate the platinum catalyst. However, if the self-bonding additive of the instant case is incorporated into the component that does not contain the platinum catalyst, then the composition as two separate components can be stored as long as desirable without any deleterious effects.

When it is desired to cure the composition, the two components are simply mixed together and applied and cured at elevated temperatures, that is temperatures above 100° C., within a two week period of time after mixing to form the desired self-bonding silicone elastomer of the instant invention.

It should be noted that with respect to the self-bonding additive that it should not be present in the total composition for a period of time of more than two weeks prior to cure of the composition, that is the self-bonding additive will act as an inhibitor and as such after the two components of the composition are mixed, they should be cured at elevated temperatures within a two week period. If more than a two week period lapses until the composition is applied to be cured at elevated temperatures, then the composition may not cure in a totally satisfactory fashion.

It should be also noted that within the invention of the instant case, there is described a preferred process for producing an aliphatically unsaturated hydrolyzable alkoxy silane hydrolysis product in which the hydrolysis of the silane monomer is a partial hydrolysis of the silane monomer. The partial hydrolysis readily and properly takes place in the presence of a dipolar aprotic solvent where there is sufficient quantities of the solvent such that there is a homogeneous reaction medium. With such a homogeneous hydrolysis medium the reaction can take place with rapidity and also efficiently so as to produce the desired patial hydrolysis product in the most efficient manner.

It is well known that acids, and specifically strong acids, will operate as catalysts for such hydrolyses of aliphatically unsaturated hydrolyzable alkoxy silanes and in accordance with the instant invention are used to advantage.

DESCRIPTION OF THE PREFERRED EMBODIMENT

The aliphatically unsaturated hydrolyzable silane preferably has the formula,

$$R_a^1 Si (OR^3)_{4-a} \quad (2)$$

where $R^1$ is an aliphatically unsaturated radical selected from the class consisting of alkenyl and alkynyl radicals of 2 to 8 carbon atoms, $R^3$ is selected from the class consisting of alkyl radicals and cycloalkyl radicals of 1 to 8 carbon atoms, and a is a whole number that varies from 1 to 2. Although $R^1$ can be an alkynyl radical it is preferably an alkenyl radical since the acetylenic radical or the alkynyl radicals are more efficient inhibitors than the alkenyl radicals which may be undesirable in the composition. Accordingly, it is desirable and preferable that the $R^1$ radical be selected from alkenyl radicals of 2 to 8 carbon atoms such as, vinyl, allyl and etc., the most preferred radical being vinyl.

With respect to the hydrolyzable radical, it is preferably selected from alkyl radicals or cycloalkyl radicals of 1 to 8 carbon atoms such as, methyl, ethyl, cyclohexyl, cycloheptyl and etc. It should be noted that many other hydrolyzable radicals will not perform in the self-bonding additive of the instant case, that is, additives having radicals such as, hydroxy, ketoximino, aminoxy, acetoxy, are undesirable for use as self-bonding additives in the instant composition since irrespective of their self-bonding properties it has been found that compounds with such hydrolyzable radicals may deactivate the platinum catalyst in the SiH-olefin platinum catalyzed compositions. Most preferably, $R^3$ is selected from alkyl radicals of 1 to 5 carbon atoms such as, methyl, ethyl and propyl.

In addition, while a may vary from 1 to 2, it is more preferable that a have a value of 1, since if there is too much unsaturation in the self-bonding additive then the unsaturation may unduly inhibit the cure of the composition and/or alter the physical properties of the cured elastomer. The most preferred radical for $R^3$ is ethyl or methyl. Accordingly, the most preferred compounds of formula (2) above for use as self-bonding additives in the instant invention is the partial hydrolysis products of the compounds of formula (2) where $R^1$ is vinyl such as, vinyltrimethoxy silane or vinyltriethoxy silane. Vinyltriethoxy silane is more preferred since the alcohol that is given off during the hydrolysis is not toxic and can be tolerated at high levels.

It should be noted that the compounds of formula (2) above by themselves cannot be used as self-bonding additives, that is, they have little or no capability as self-bonding additives. What must be utilized as a self-bonding additive in the compositions of the instant case is the partial hydrolysis product of the compounds of formula (2), such that the compound of formula (2) is hydrolyzed such that 16 to 49% mole percent of the $OR^3$ groups are hydrolyzed. Of course, this is the average number of hydrolyzed $OR^3$ groups that would be in a particular composition noting that in a particular molecule of the silane one or more of the $OR^3$ groups would be hydrolyzed. If more than 49% on the average of $OR^3$ groups is hydrolyzed then the partial hydrolyzate of compounds of formula (2) tends to approach the gel stage and thus is undesirable in SiH-olefin platinum catalyzed compositions for two reasons. First of all the composition does not have good self-bonding properties, and secondly, the gel form of the compound of formula (2) tends to seriously detract from the physical properties of the SiH olefin platinum catalyzed composition. If less than 16% of the $OR^3$ groups are hydrolyzed then the partial hydrolyzate may contain too much of the monomer of formula (2) which does not impart any self-bonding properties to the composition and dilutes the effects of the partial hydrolyzate.

More preferably the average number of $OR^3$ groups hydrolyzed in the monomer of formula (2) varies anywhere from 25 mole percent to 40 mole percent and is most preferably 33 mole percent. The optimum value for the amount of hydrolyzed $OR^3$ groups in the monomer silane of formula (2) is 33 mole percent since it is found that the optimum self-bonding properties as well as curing properties of the SiH-olefin platinum catalyzed composition is obtained when on the average only one of the $OR^3$ groups in the silane of formula (2) is hydrolyzed.

It should also be noted that the self-bonding additive of the instant invention is preferably utilized at a concentration that varies anywhere from 0.1 to 5 parts by weight based on 100 parts of the base vinyl containing polymer of formula (1), and more preferably varies at a concentration of 1 to 1.5 parts per 100 parts of the base vinyl-containing polymer of formula (1). If too little an amount of the partial hydrolyzate is used, then the desired degree of self-bonding is not obtained. If too much of the self-bonding additive is used, that is, more than 5 parts, then, that high concentration of the self-bonding additive can alter the stoichiometric/structure balance of SiH and olefin and the composition may not cure properly. This balance of the SiH-olefin platinum catalyzed reaction would be altered due to the high excess of vinyl units that would be present as a result of the addition of the self-bonding additive in more than the concentration set forth previously.

It should also be noted that a high excess of the partial hydrolyzate above the quantities set forth previously may result in less than desirable pot life periods. The reaction for producing the partial hydrolyzate is a simple but exacting reaction. Generally, it is desired that the hydrolysis reaction take place in a homogeneous hydrolysis medium and to this end there is utilized in the hydrolysis medium to carry out the hydrolysis reaction in a dipolar aprotic solvent that is capable of dissolving the compound of formula (2), as well as the amount of water that is necessary to partially hydrolyze it. Examples of dipolar aprotic solvent are, for instance, acetone, diethylketone, methylethyl ketone, dioxane and tetrahydrofuran. The most preferable solvent is acetone since it has the desirable solvent properties for the silane of formula (2), as well as the water that is necessary to partially hydrolyze it and is sufficiently volatile to permit its easy removal from the crude hydrolysis product.

In the preferred hydrolysis procedure, both the water and the compound of formula (2) are mixed with the solvent at the same time. It has been found that the best partial hydrolyzate compositions are reached in this fashion.

In another alternate hydrolysis procedure the water is dissolved in the solvent and the silane added to the solution in which the hydrolysis reaction takes place. Yet another alternate procedure is to add the water to the silane and solvent.

Generally, in such hydrolysis reactions in accordance with the amount of partial hydrolyzate that is desired there will be added anywhere from 0.5 to 1.5 moles of water per mole of the silane of formula (2). The resulting addition may be carried out under agitation although agitation is not strictly necessary since the reaction takes place in a homogeneous hydrolysis medium. It should be noted that enough of the solvent is utilized so that there is always a homogeneous hydrolysis medium during said partial hydrolysis. It can be appreciated that the reaction can take place without the presence of a solvent or with other types of solvents. However, when there are two phases present in the hydrolysis medium then the hydrolysis reaction will take place but takes place at a much slower rate, and not in the most preferred manner as described above.

In addition, as stated previously, anywhere from 0.5 moles to 1.5 moles of water may be utilized per mole of the silane of formula (2) so as to hydrolyze and obtain a partial hydrolyzate with the before stated average number of hydrolyzed $OR^3$ substituent groups in the compound of formula (2). Most preferably, of course, there is utilized 1 mole of water per mole of the silane of formula (2) so as to obtain a partial hydrolyzate in which the average number of $OR^3$ substituent groups hydrolyzed is 33 mole percent in the compound of formula (2). It should be noted further that it is preferable that the reaction take place near normal ambient temperatures although temperatures in the range of 10° C. to 50° C. can be tolerated.

The criticality in the above process for producing the partial hydrolyzate lies in the use of dipolar aprotic solvent in producing a homogeneous hydrolysis medium during the reaction. There is also a second aspect in the process for producing the partial hydrolyzate in accordance with the invention of the instant case and that is the presence of an acid catalyst during the hydrolysis. It has been found that without an acidic catalyst in the homogeneous hydrolysis medium that the hydrolysis takes place very slowly or over a prolonged period of time. Accordingly in order to speed up the reaction, there should be present a catalytic amount of acid in the hydrolysis medium, that is, acetic acid or hydrochloric acid, sulfuric acid, that is, any type of mild or strong acid, in sufficient quantities so as to raise the acidity of the hydrolysis medium of anywhere from, generally, 10 to 500 parts per million and more preferably from 10 to 50 parts per million.

It has been found that with the use of such acids in the hydrolysis medium and with the temperature range of 10° to 50° C. the reaction will proceed to yield desirable compositions in a period of anywhere from 0.5 to 12 hours and that without an acidic catalyst the reaction reaches this completion only after much longer period of time. It should be noted with the acidic catalyst in the foregoing concentrations that the reaction is substantially complete in as little as 0.5 hours. Accordingly, with the above acid concentration in a homogeneous hydrolysis medium, the partial hydrolysis will be complete in a period of time of as little as 0.5 hours. It should be noted that the catalyst may be any acidic catalyst; a few of the well known acidic catalysts having been given previously. Further, it is preferred that not too much of the acidic catalyst be added so that no difficulty will be encountered in removing the excess acid after the hydrolysis reaction is completed. To utilize the self-bonding additive, that is, the partial hydrolyzate of the compound of formula (2) as a self-bonding additive in SiH-olefin platinum catalyzed compositions, its acidity has to be below 10 parts per million, otherwise, the excess acidity will affect the cure and final physical properties of the elastomer that is formed. Accordingly, to facilitate in the purification and preparation of the final partial hydrolysis product, it is desired that a lower amount of acidity be used in the homogeneous hydrolysis reaction.

In any case, there has to be added a neutralizing agent such as, sodium bicarbonate, to the homogeneous hydrolysis medium after the hydrolysis reaction is complete to substantially neutralize the acid and then the solution is filtered to remove the salts formed therefrom. If the acidity is not too high-say 10 ppm or less, then the partial hydrolyzate product may be obtained in its final form by simply stripping off the solvent, the unreacted water and some unreacted silane of formula (2) still remaining in the composition, by heating the mixture at a temperature in the range of 100° to 125° C., either at atmospheric pressure of preferably sub-atmospheric pressure. If the composition has excess acidity as noted previously, sodium bicarbonate is added to the homogeneous hydrolysis medium after the hydrolysis reaction is complete to neturalize the excess acid and then the solution is filtered and then finally the solvent and water and some unreacted silane of formula (2) is stripped off by heating the solution at a temperature in the range of 100° to 125° C., preferably at sub-atmospheric pressure until these ingredients are removed. At any rate, by this procedure there is obtained a partial hydrolyzate product which is the self-bonding additive of the instant case.

To insure its optimum use in the SiH-olefin platinum catalyzed compositions it is necessary to further dry the partial hydrolyzate so as to remove substantially all residual water. Anhydrous sodium or magnesium sulfate among other dessicants may be utilized for this purpose to sufficiently dry the partial hydrolyzate product. It should be noted that even with small quantities of water in the partial hydrolyzate product such water will interfere with the SiH-olefin platinum catalyzed composition and result in the evolution of hydrogen which may cause the composition to foam or in the alternative may result in there not being enough of the hydride cross-linking agent to cross-link with the vinyl polysiloxane polymer of formula (1) which results in a soft elastomer being obtained, that is, an elastomer that does not have good physical properties.

Accordingly, after the above procedure there is obtained a partial hydrolysis product of the compound of formula (2) which is the self-bonding additive of the instant case. It should be noted that such partial hydrolyzate product consists of some silane of formula (2) mixed with a partial hydrolyzate which generally comprises olefinically containing siloxanes which may be dimers, trimers, tetramers, and etc., that is, mainly linear siloxanes or branched chain siloxanes of low molecular weight having olefinically substituent groups as well as containing the unhydrolyzed $OR^3$ radicals in the polymer chain. It has been found that the above partial hydrolysis product is the self-bonding additive of the instant case for SiH-olefin platinum catalyzed compositions.

The basic ingredient of the SiH-olefin platinum catalyzed composition is well known in the art. Such basic ingredient comprises 100 parts by weight of vinyl siloxanes of formula (1) above. In the above description R is given as being selected from the class of monovalent hydrocarbon radicals and halogenated monovalent hydrocarbon radicals and generally may be selected from alkyl radicals of 1 to 8 carbon atoms, such as, methyl, ethyl; cycloalkyl radicals such as, cyclohexyl of 4 to 8 carbon atoms; mononuclear aryl radicals such as phenyl, methyl, ethylphenyl; fluoroalkyl radicals such as 3,3,3-trifluoropropyl and alkenyl radicals such as vinyl, allyl and etc. In the most preferred embodiment of the instant case, it is preferred that there be no olefinically unsaturated radicals other than at the terminal position of the polymer chain of the compounds of formula (1). Accordingly, most preferably the R radical is selected from alkyl radicals of 1 to 8 carbon atoms, mononuclear aryl radicals of 6 to 8 carbon atoms such as, phenyl and fluoroalkyl radicals of 3 to 8 carbon atoms such as, 3,3,3-trifluoropropyl. Generally, it is indicated that x may vary in the polymer such that the polymer has a viscosity that varies anywhere from 100 to 200,000,000 centipoise at 25° C., but in the more preferred embodiment it is preferred that the vinyl-terminated polymer that is, the base polymer, have a viscosity that varies anywhere from 300 to 500,000 centipoise at 25° C. and more preferably has a viscosity that varies from 300 to 200,000 centipoise at 25° C. Although the self-bonding additive of the present invention may be used with high viscosity compositions, nevertheless, it is more desirable in low viscosity compositions. The self-bonding additive of the instant case can be utilized with any two component high viscosity SiH-olefin platinum catalyzed composition, however, it is more effective as a self-bonding additive in low viscosity SiH-olefin platinum catalyzed compositions. It is especially effective in low viscosity compositions that are clear and use vinyl containing silicone resin in place of reinforcing fillers. Accordingly, the self-bonding additive of the instant case finds wide application as a self-bonding additive for low viscosity SiH-olefin platinum catalyzed compositions. Thus, it is desired that the vinyl polysiloxane polymer of formula (1) have a viscosity that generally varies anywhere from 100 to 200,000 centipoise at 25° C.

The process for producing such vinyl-containing polymers is well known in the art, and generally comprises the equilibrating of the appropriate substituted cyclotetrasiloxanes in the presence of a basic catalyst, most preferably, potassium hydroxide. In order to obtain vinyl termination on the polymer chain and also to obtain the appropriate viscosity in the final polymer there is utilized the appropriate amount and type of chain stoppers in the equilibration reaction medium. Thus, divinyltetramethyldisiloxane may be utilized as a chainstopper to produce the vinyl-terminated polymer of formula (1) in the desired viscosity. The chain stopper, cyclotetrapolysiloxanes and the required amount of catalyst which may be present at a concentration of anywhere from 10 to 100 parts per million is then heated at temperatures above 150° C. for periods of time averaging from 1 to 8 hours to produce the linear polysiloxane and polymer of formula (1). At the equilibration point approximately 80 to 85% of the cyclotetrasiloxanes have been converted to the polymer and there is as much of the polymer as being prepared from cyclotetrasiloxanes as there is of the polymer breaking up to form the cyclotetrasiloxanes at the equilibration point.

At that point the catalyst is simply neutralized and the cyclics stripped off to give the desired linear polysiloxane polymer of formula (1). To 100 parts by weight of the base polymer of formula (1) above there is utilized from 1 to 50 parts by weight of a hydride siloxane cross-linking agent. Such a hydride siloxane cross-linking agent may be, for instance, have the formula,

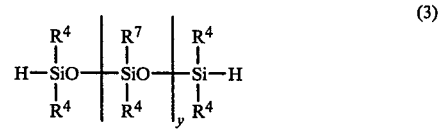

(3)

where $R^7$ is selected from the class consisting of hydrogen, monovalent hydrocarbon radicals and halogenated monovalent hydrocarbon radicals, $R^4$ is a monovalent hydrocarbon radical and is more preferably selected from the class consisting of alkyl radicals of 1 to 8 carbon atoms; cycloalkyl radicals of up to 8 carbons; mononuclear aryl radicals such as, phenyl, and 3,3,3-trifluoropropyl radicals. Accordingly, $R^4$ may be selected from the class consisting of hydrogen and any saturated monovalent hydrocarbon radical, and halogenated monovalent hydrocarbon radical such as, for instance, fluoroalkyl radicals of 3 to 8 carbon atoms such as, 3,3,3-trifluoropropyl. Preferably, the $R^4$ radical is selected from alkyl radicals of 1 to 8 carbon atoms such as, methyl, ethyl, propyl; mononuclear aryl radicals such as, phenyl and fluoroalkyl radicals of 3 to 8 carbon atoms such as 3,3,3-trifluoropropyl.

In the foregoing formula (3), y varies such that the polymer has a viscosity in the range of 5 to 500 centipoise at 25° C. and more preferably has a viscosity that varies from 10 to 50 centipoise at 25° C. In place of this hydride cross-linking agent there may be utilized a silicone resin cross-linking agent, that is, a hydride silicone resin cross-linking agent which is generally a silicone resin composed of H $R_2^5SiO_{0.5}$ units and $SiO_2$ units where the ratio of the H+$R^5$ radicals to Si varies from 1.1 to 1 to 2.7 to 1 and where $R^5$ can consist of the same radicals as those given for the $R^4$ radical given above.

The hydride polysiloxane of formula (3) as well as the hydride siloxane silicone resin given previously are easily obtained by simply hydrolyzing the appropriate chlorosilanes in water and then purifying the desired product. In the case of the resin this may involve the use of a solvent during the hydrolysis such as a water immiscible organic solvent selected from benzene, toluene, xylene and etc. At any rate such hydrolysis reactions for producing such hydride silicone resins is well known as well as the process for producing the hydrogen-containing polysiloxane polymer of formula (3) above. The polysiloxane polymer of formula (3) above may also be obtained by equilibrating a cyclotetrasiloxanes in the presence of an acid catalyst such as toluene sulfonic acid at elevated temperatures with the appropriate type of hydride chainstoppers. In such equilibration procedure, the neutralization and venting of volatiles is followed as well as the same heating step during equilibration to produce the desired hydrogen polysiloxane polymer of formula (3) above. These processes will not be going into detail since such is well known in the art.

In addition to the hydride silicone resin composed of monofunctional units and tetrafunctional units there may be utilized as a cross-linking agent a hydride silicone resin composed of $HR_2^5 SiO_{0.5}$ units and $SiO_2$ units and $R_2^5$ SiO units where the H+$R^5$ to Si ratio varies anywhere from 1.1 to 1 to 2.7 to 1, where $R^5$ is as defined previously. More preferably, the silicone resin composed of the hydrogen containing siloxane monofunctional units and the tetrafunctional siloxy units is preferred as a cross-linking agent in the compositions of the instant case or the hydrogen siloxane of formula (3) above. The silicone resin containing the difunctional siloxy units is more difficult and expensive to produce. However, such a resin could be utilized as a cross-linking agent with the SiH-olefin platinum catalyzed composition of the instant case.

As a catalyst there is utilized anywhere from 1 to 500 parts per million and more preferably from 1 to 200 parts per million of a platinum catalyst.

Many types of platinum compounds for this SiH olefin addition reaction are known and such platinum catalysts may be used also for the reaction of the present case. The preferred platinum catalysts especially when optical clarity is required are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2.C_3H_6)_2$ described in U.S. Pat. No. 3,159,662, Ashby.

Still, further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetravinyltetramethylcyclotetrasiloxane in the presence of sodium bicarbonate in an ethanol solution.

To enhance the physical properties of the composition there may be incorporated in the base vinyl-containing polymer from 10 to 200 parts by weight of a filler, based on 100 parts of the base vinyl-containing polymer of Formula (1), when the filler is selected from the class of reinforcing fillers and extending fillers. Generally, the reinforcing fillers are such fillers such as, fumed silica and precipitated silica while examples of extending fillers are, for instance, fused quartz and etc. The reinforcing fillers are preferred for strength properties, however, the extending fillers are less expensive and also do not tend to increase the viscosity of the uncured composition as much.

In order to get the high desired tensile strength in the compositions of the instant case and particularly when such compositions are formed to thin coatings or films, it is desirable to incorporate a filler into the composition. Illustrative of the many fillers, which can be employed are titanium oxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite cork, cotton, synthetic fibers and etc.

The preferred fillers that should be utilized in the composition of the instant case and particularly in component (A) of the instant case, is preferably either a fumed silica or a precipitated silica that has been treated. Thus, the silica fillers may be treated as, for example, as disclosed in U.S. Pat. No. 2,938,009, Lucas with cyclic polysiloxanes.

Another method for treating fillers or treated fillers that can be utilized in the invention of the instant case is that disclosed in Brown U.S. Pat. No. 3,024,126, disclosure of which patents are incorporated into the present case by reference.

More specifically, silazane treated fillers in accordance with the disclosure of Smith U.S. Pat. No. 3,635,743 and Beers, patent application, Ser. No. 311,486, filed Dec. 4, 1972, are preferred as the treated fillers to be utilized in the compositions of the present case.

For more information as to the preparation of the base vinyl containing polymer as well as the hydride polysiloxane and as to the general details as to such SoH-olefin platinum catalyzed compositions, one is referred to the U.S. Patent of Jeram, et al, U.S. Pat. No. 3,957,713, which is hereby incorporated by reference. As noted in that patent, other ingredients well known in SiH-olefin platinum catalyzed compositions may be incorporated in the basic composition to obtain one property or another in the cured elastomer that results from the composition.

Thus, based on 100 parts of the base vinyl containing polymer of formula (1), there may be added to the composition from 1 to 30 parts by weight of a vinyl-containing polymer of the formula,

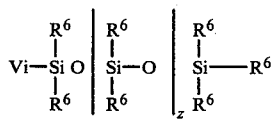

(4)

or vinyl containing silicone resin of formula,

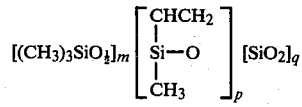

where m, p, q vary such that the resin contains from 2.5 to 10 mole percent of vinyl groups, and where $R^6$ is selected from the class consisting of alkyl radicals, cycloalkyl radicals, aryl radicals and fluoroalkyl radicals of 1 to 8 carbon atoms and where z varies such that the viscosity of the polymer varies from 100 to 5,000 centipoise at 25° C., and more preferably varies from 100 to 1,000 centipoise at 25° C.

Preferably, $R^6$ is selected from radicals such as, methyl, phenyl and 3,3,3-trifluoropropyl and is most preferably selected from methyl and phenyl. The vinyl-containing polymer of Formula (4) as given above when added to the basic vinyl-containing polymer will result in a cured elastomer with higher strength properties and for instance, higher tear than when the SiH-olefin platinum catalyzed composition does not contain such an ingredient.

For the preparation of fluorosilicone substituted SiH-olefin platinum catalyzed compositions, one is referred to the patent of Jeram, U.S. Pat. No. 4,041,010, whose disclosure is hereby incorporated by reference. Both of these patents disclose the preparation of the appropriate base vinyl-containing polymers, the type of platinum catalyst that can be utilized and the type of hydride siloxane cross-linking agents as well as fillers and other ingredients that are traditionally added to SiH-olefin platinum catalyzed compositions to produce a cured elastomer.

It should be understood that the self-bonding additive of the instant case is not disclosed to be utilized only with the composition of these patents but can be utilized generally with most SiH-olefin platinum catalyzed compositions and that the above patents are given as being exemplary of both traditional SiH-olefin platinum catalyzed compositions as well as fluorosilicone SiH-olefin platinum catalyzed compositions. It is well known in addition to the above basic ingredients disclosed above for the SiH-olefin platinum catalyzed compositions to which the self-bonding additive of the instant case can be added, there may be added other ingredients as long as they do not interfere with the self-bonding properties of the ingredient of the instant case such ingredients being, for instance, pigments and etc. that are traditionally added to SiH-olefin platinum catalyzed compositions as well as fluorosilicone SiH-olefin platinum catalyzed compositions. It is well known in addition to the above basic ingredients disclosed above for the SiH-olefin platinum catalyzed compositions to which the self-bonding additive of the instant case can be added, there may be added other ingredients as long as they do not interfere with the self-bonding properties of the ingredient of the instant case such ingredients being, for instance, pigments and etc. that are traditionally added to SiH-olefin platinum catalyzed compositions. It should be noted, however, that for clear potting compounds, a pigment may not be a desirable additive for SiH-olefin platinum catalyzed potting compositions. However, various vinyl-containing fluids and/or resins that are known for addition to SiH-olefin platinum catalyzed compositions may be added to the basic ingredients disclosed above and as disclosed in the foregoing Jeram patents to enhance one or the other properties of the cured elastomer that is formed from the composition.

As noted previously, the self-bonding additive of the instant case is to be applied to two component SiH-olefin platinum catalyzed compositions and be applied to that component of two-component SiH-olefin platinum catalyzed compositions which does not contain the platinum catalyst.

Accordingly, preferably the filler or vinyl containing silicone reinforcing resin is incorporated into the base vinyl-containing polymer of Formula (1) and the platinum catalyst may be added to it and the composition is thus stored separately along with the other ingredients. To form the second component of the second package, the hydrogen siloxane cross-linking agent is then packaged by itself or with some of the filler along with it and without any of the vinyl-containing polymer if the platinum catalyst is to be incorporated along with the hydrogen polysiloxane. However, if the platinum catalyst is incorporated with the base vinyl-containing polymer of Formula (1) and the filler, then the vinyl-containing fluids may also be incorporated along with hydrogen siloxane cross-linking agent component. As long as the platinum catalyst is not present with the hydrogen siloxane and the low viscosity vinyl-containing polymers, then the component will not cross-link or cure. However, if the platinum catalyst is incorporated along with the hydrogen siloxane cross-linking agent, then the vinyl-containing fluids must be packaged in the other component that is with the base vinly-containing polymer.

The self-bonding additive must be packaged in that component which does not contain the platinum catalyst, otherwise, it may have a tendency to deactivate and ultimately poison the platinum catalyst upon storage. Accordingly, the two components are packaged, shipped and stored as such and when it is desired to cure the composition the components are simply mixed in the specified amounts and formed to the desired part. It is then necessary to heat the composition to a temperature above 100° C. so that the composition can cure to a self-bonding silicone elastomer in periods of time varying from a few minutes to 1 to 2 hours depending on the level of heating. It should be noted that once the two components are mixed that it is necessary to cure the composition within two weeks since if the mixed composition is not cured within such a period then it may be very difficult to cure the composition, if at all, due to deactivation of the platinum catalyst. Accordingly, once the two components are mixed it is desirable that the composition be cured within a two week period. As can be understood with the compositions of the instant case, after the two components are mixed the mixed composition has a pot life of two weeks wherein the composition will not cure at room temperature but will cure at elevated temperatures, that is, temperatures above 100° C., to a silicone elastomer.

The examples below are given for the purpose of illustrating the reduction to practice of the instant invention. They are not given for any purpose of setting limitations in the scope of the specification and claims of the instant case and they are not given for any purpose of defining the scope of the invention. All parts in the examples are by weight.

EXAMPLE I

An adhesion promoting additive composition was prepared as follows: Into a 1-quart bottle there were charged 250 parts acetone, 191 parts vinyltriethoxysilane, and 18 parts of water. The bottle was capped and shaken moderately. A mild exotherm ensued. During the exotherm the bottle was vented several times. After the exotherm waned the mixture stood overnight. A titration then showed the product mixture was 10 ppm acid, no doubt owing to trace residual silyl chloride in the vinyltriethoxysilane. The mixture was stripped to 100° C. at maximum vacuum (25 inches) in a rotary evaporator. The final product weighed 103 parts. It was clear, water-white liquid. Anhydrous sodium sulphate was employed to dry the material prior to analysis and use. Analyses of the stripped product by gas chromatography showed some reactant silane survived (up to 5%) but that more substantial vinyl silicone was present as dimer (approximately 40%) and higher mers (approximately 40%). A trace of ethyl alcohol was also present in the stripped product.

EXAMPLE II

An adhesion promoting additive composition was prepared as follows:

Into an all glass reaction apparatus fitted for reagent addition were charged 135 parts of acetone, 255 gm vinyl-triethoxysilane, and a few drops of 12 molar hydrochloric acid. While stirring gently, 24 parts of water was admitted as a rate sufficient to generate a mild exotherm, but keeping the reaction temperature below 50° C. The reaction mixture was allowed to stir gently for 2 hours following water addition and then cooled to room temperature. Approximately 5 parts of sodium bicarbonate was added to neutralize the acid. This mixture stirred an additional hour and was then filtered through celite at the pump. The filtrate was stripped under vacuum (28") at 100° C. and dried over anhydrous magnesium sulphate. Approximately 100 parts of product was obtained.

The product was a clear, water-white liquid. It contained less than 10 ppm acid and contained less than 0.05% by weight of water. An infrared spectrum was in agreement with the expected composition, showing bands due to vinyl at 6.25 microns and siloxy at 9–10 microns, etc. Anaylses by gas chromatography inidcated that about 5–10% by weight of the mixture was unconverted vinyltriethoxysilane, the remainder being dimer and higher mers. A small amount (<1%) of ethyl alcohol was also detected.

EXAMPLE III

There was prepared a clear resin reinforced potting-/encapsulating composition after the teaching of U.S. Pat. No. 3,425,967 to Modic. The composition consisted of two packages, A and B. Package A was comprised of 75 parts of a base polymer of the average formula,

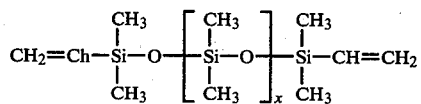

where x was such that the polymer had a viscosity of 4000 cps at 25° C., 25 pts of a resin of the average formula,

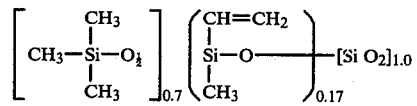

and 10 ppm Pt in the form described in U.S. Pat. No. 3,220,972 to Lamoreaux. Package B was comprised of 50 pts. of the above descirbed base polymer present in Package A and 50 pts. of a resin crosslinker of the average formula,

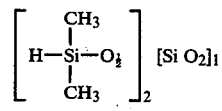

To 100 pts. of Package A was added 1 pt. by weight of the adhesion promoting addition composition of Example I. This mixture was then combined immediately with 10 pts. of Package B and mixed thoroughly. The mixture did not cure at ambient laboratory temperatures. The mixture did cure at elevated temperatures. For example, after 1 hours time at 100° C., the mixture cured to form a clear silicone elastomer. For up to 14 days following its preparation, the mixture cured satisfactorily on exposure to 100° C. for 1 hour. Following the 14-day period, unsatisfactory cures were obtained at this raised temperature (100° C.) in that the fnal elastomer was too soft.

The physical properties of the compositions with and without the self-bonding additive were as follows:

| | Without | With |
|---|---|---|
| Tensile 920 psi | | 820 |
| Elongation 150% | | 160 |
| Durometer - Shore A 35 | | 28 |
| Tear - 40 lbs./in | | 20 |

Thus, no significant reduction in physical properties of the cured elastomer result from the additive being present at the level of the example.

EXAMPLE IV

To the above SiH-olefin platinum catalyzed composition of Example III there was added 1 part by weight of the partial hydrolysis vinyl siloxy silane of Example I. During the 14-day period of satisfactory elevated temperature cure detailed in Example III, a 60 mil thickness of RTV composition of Example III was applied to each substrate tested and curved in place by baking one hour at 300° F. Again no substantial reduction in the physical properties of the cured rubber was observed.

The 60 mil thickness of RTV was applied to each substrate tested and cured in place as described. All surfaces were clean in the usual sense. The cured silicone elastomer which was a clear SiH-olefin platinum catalyzed composition had good clarity at this thickness. The following bonds were obtained:

| TABLE OF BONDING PROPERTIES | |
|---|---|
| Substrate | Bond |
| glass | excellent |
| aluminum (bare) | marginal |
| steel (carbon) | excellent |
| copper | excellent |
| stainless steel | excellent |

An excellent bond is taken to mean a cohesive failure bond was noted when attempts to remove the cured elastomer from the surface were made. No bonds developed without the additive present. The bond to aluminum was improved to excellent by priming the surface with a silicone primer. These same results were obtained in each of three instances when the bonding tests were repeated during the 14 day period of satisfactory raised temperature cure.

We claim:

1. A self-bonding silicone rubber composition comprising (A) 100 parts by weight of a base polymer of the formula,

where R is selected from the class consisting of monovalent hydrocarbon radicals and halogenated monovalent hydrocarbon radicals, and x is such that the viscosity of the base polymer varies from 100 to 200,000,000 centipoise at 25° C.; (B) from 0.5 to 50 parts by weight of a hydride siloxane cross-linking agent; (C) from 1 to 500 parts per million of platinum catalyst; and (D) from 0.1 to 5 parts by weight of a self-bonding additive which is the partial hydrolysis product of a compound of the formula,

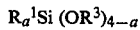

wherein $R^1$ is an aliphatic unsaturated radical selected from the class consisting of alkenyl radicals and alkynyl radicals of 2 to 8 carbon atoms, $R^3$ is selected from the class consisting of alkyl radicals and cycloalkyl radicals of 1 to 8 carbon atoms and a is 1 and wherein the partial hydrolysis product is such that on the average 16 to 49 mole percent of the hydrocarbonoxy groups of said silane are hydrolyzed.

2. The composition of claim 1 wherein 1 to 1.5 parts by weight of self-bonding additive is utilized.

3. The composition of claim 1 wherein R is selected from the class consisting of alkyl radicals, cycloalkyl radicals, aryl radicals and flucroalkyl radicals of 1 to 8 carbon atoms.

4. The composition of claim 1 wherein the hydride siloxane cross-linking agent has the formula,

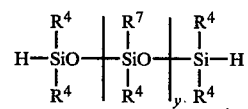

where $R^7$ is selected from the class consisting of hydrogen, monovalent hydrocarbon radicals and halogenated monovalent hydrocarbon radicals, $R^4$ is a monovalent hydrocarbon radical and y varies such that the polymer has a viscosity in the range of 10 to 500 centipoise at 25° C.

5. The composition of claim 1 wherein the hydride silixoane cross-linking agent is a resin composed of H $R_2^5$ SiO$_{0.5}$ units, and SiO$_2$ units wherein the ratio of the H+R$^5$ radicals to Si varies from 1.0 to 1.0, to 2.7 to 1.0 wherein R$^5$ is selected from the class consisting of monovalent hydrocarbon radicals and halogenated monovalent hydrocarbon radicals.

6. The composition of claim 1 wherein there is additionally present from 10 to 200 parts by weight of a compound selected from reinforcing fillers, extending fillers, and a vinyl-containing reinforcing resin comprising R$^6$SiO$_{0.5}$ units and SiO$_2$ units, in which from about 2.5 to 10 mole percent of the silicon atoms contain silicon-bonded vinyl groups where R$^6$ is a monovalent hydrocarbon radical.

7. The composition of claim 1 wherein the reinforcing filler is selected from the class consisting of fumed silica and precipitated silica.

8. The composition of claim 7 wherein said filler is treated with a treating agent selected from the class consisting of cyclosiloxanes silazanes and mixtures thereof.

9. The composition of claim 1 wherein there is present from 1 to 30 parts by weight of a vinyl-containing polymer of the formula,

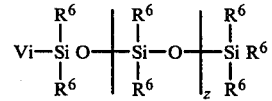

wherein R$^6$ is selected from the class consisting of alkyl radicals, cycloalkyl radicals, aryl radicals and fluoroalkyl radicals of 1 to 8 carbon atoms where z varies such that the viscosity of the polymer varies from 100 to 5,000 centipoise at 25° C.

10. The composition of claim 1 wherein there is present from 0 to 50 parts by weight of a vinyl-containing silicone resin.

* * * * *